United States Patent
Stubblefield et al.

[15] 3,650,475
[45] Mar. 21, 1972

[54] CARBON BLACK BURNER CONSTRUCTION

[72] Inventors: Charles David Stubblefield, Baton Rouge, La.; John Lee Wells, Borger, Tex.

[73] Assignee: J. M. Huber Corporation, Borger, Tex.

[22] Filed: Jan. 7, 1970

[21] Appl. No.: 1,092

[52] U.S. Cl..........................................239/419.3, 239/423
[51] Int. Cl......................................................F23d 11/16
[58] Field of Search...............239/423, 424, 434.5, 290, 296, 239/419.3

[56] References Cited

UNITED STATES PATENTS

| | | | |
|---|---|---|---|
| 1,952,236 | 3/1934 | Clawson | 239/423 X |
| 2,965,163 | 12/1960 | Lange et al. | 239/419.3 X |
| 2,990,749 | 7/1961 | Thiers et al. | 239/419.3 X |

*Primary Examiner*—Lloyd L. King
*Attorney*—Harold H. Flanders

[57] ABSTRACT

An improved carbon black burner construction utilizing multiple arrays of gas jets spaced from the oil discharge orifice and including a venturi atomizing tip just prior to the oil discharge orifice improves the light transmittance of a benzene extract from nonstaining large particle size, high structure carcass carbon blacks.

4 Claims, 1 Drawing Figure

PATENTED MAR 21 1972  3,650,475
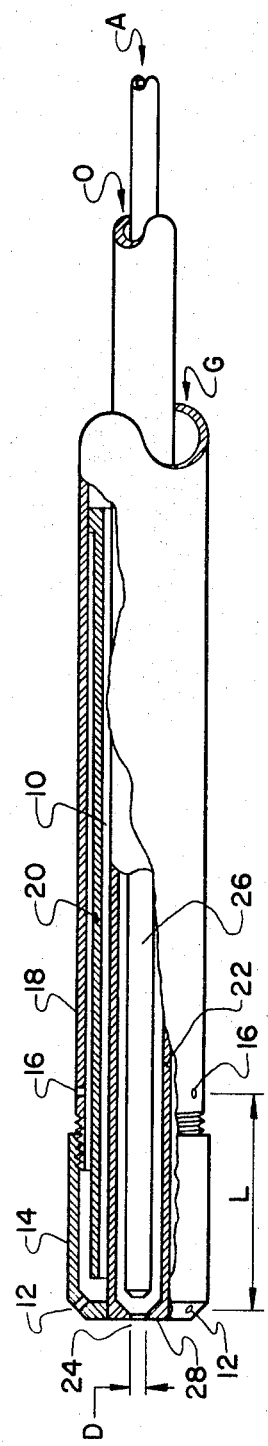

CARBON BLACK BURNER CONSTRUCTION

BACKGROUND OF THE INVENTION

In general, the present invention relates to burner construction and more particularly to an improved carbon black burner construction.

A frequently employed test in the carbon black industry is the "Discoloration of Benzene by Carbon Black" designated ASTM: D1618-65T. Briefly, this test constitutes a determination of the degree of discoloration of benzene by carbon black and hydrocarbons adhering to or associated with the carbon black as produced by means of a spectrophotometer expressed in percentage light transmission at a wave length of 425 millimicrons, assuming the absorption cell of the spectrophotometer filled with boiled, filtered benzene to have 100 percent transmission.

High benzene discoloration with a corresponding decrease in its percent transmittance as determined by ASTM: D1618 may result when coke is present in the carbon black manufacturing process. Coke often forms on and around the tip of the burner structure as a result of variations in furnace pressures in this region. These pressure variations cause small oil droplets to come into contact with the vapor tube tip and result in the formation of a cone of coke. The production of excess coke may be reduced or eliminated by altering the air flow patterns and other conditions producing unstable combustion near the burner. However, in altering the conditions in the area surrounding the burner it is necessary to do so in such a way as to not interfere with the obtaining of the desired level of structure for the carbon black or in a way which alters in an undesired way the carbon black particles size. An additional coking problem may also exist internally within the burner structures of the prior art. A significant factor causing this problem in prior art structures is the mixing of the atomizing media with the hot oil in a chamber external to the main body of the burner assembly. The intimate mixture of air with the oil to be atomized may then of necessity be forced to flow the entire burner length before being sprayed out of the nozzle. The intimate contact provided results in a progressive buildup of coke within the burner structure which gradually reduces the flow of atomizing air or gas and continuously degrades the operation of the burner.

SUMMARY OF THE INVENTION

Accordingly, it is an object of the present invention to provide a new and highly effective carbon black burner construction which overcomes the deficiencies of the prior art as described above.

It is a further object of the present invention to provide a carbon black burner construction capable of producing a carbon black which exhibits nonstaining properties.

Another object of the present invention is to provide a carbon black burner construction which provides a more stable flame and combustion conditions in the areas surrounding the burner to reduce the formation of coke.

An additional object of the present invention is to provide a carbon black burner construction capable of achieving carbon black of the desired structure and particle size with low discoloration of benzene when tested according to ASTM: D1618-65T.

Another object of the present invention is to provide a carbon black burner construction in which internal coking within the burner is minimized.

Other objects and a fuller understanding of the present invention may be had by referring to the following description and claims taken in conjunction with the accompanying drawing.

The present invention overcomes the deficiencies of the prior art and achieves its objectives by providing for multiple arrays of gas jets properly spaced from the oil discharge orifice and by the provision of an atomizing venturi tip just prior to the oil discharge orifice.

BRIEF DESCRIPTION OF THE DRAWING

In order to facilitate the understanding of the present invention reference will now be made to the appended drawing of a preferred embodiment of the present invention. The drawing should not be construed as limiting the invention but is exemplary only.

In the drawing:

The FIGURE is a partial cross-sectional representation of a preferred embodiment of the present invention.

DESCRIPTION OF THE PREFERRED EMBODIMENT

While there is no general theory available enabling one to define in detail the effects of various modifications in burner structure, particularly with regard to the manner in which such modifications in burner structure may effect the properties of the carbon black produced, it has been found that the burner construction defined below is particularly advantageous for the production of nonstaining large particle size, high structure carcass carbon blacks which when tested according to ASTM: D1618 exhibit low benzene discoloration and high transmittance. Briefly, in accordance with the present invention, the preferred embodiment of the present invention is shown in the appended drawing. Gas, indicated in general by the arrow G, passes down the space 10 defined by outer concentric tubing wall 18 and tubing 22 to exit at a plurality of jet ports 12 in the tip of the burner nozzle 14. Gas also flows out a plurality of gas jets 16 spaced a distance designated L behind the first plurality of jet ports 12. The additional gas jets 16 in the outer tubing wall 18 provide for structural and benzene discoloration properties intermediate to those which would be obtained were a plurality of jets to be placed in the tip 14 only or if a plurality of gas jets were to be placed a greater distance back in the burner without the use of a group of gas jets in the tip 14 of the burner. A baffle wall 20 may optionally be attached to the outer wall 18 and may be utilized to control the flow of the gas to provide cooling to the burner tip 14 while bringing the gas to the exit gas jets 12 and 16. An inner-concentric tube 22 defines the area through which the oil feedstock flows as indicated schematically by the arrow designated O. The oil tubing 22 ends in orifice 24 at the tip of nozzle 14. The orifice which acts as the oil discharge orifice 24 has a diameter designated D. Centrally disposed within the oil tubing 22 is a tube 26 through which air, gas or other suitable atomizing fluid may pass. The tubing ends at a venturi tip designated 28 closely adjacent, proximate to and directly behind oil discharge orifice 24. The flow of atomizing fluid indicated by the designation A passing through tube 26 ending at the venturi tip 28 serves to atomize the oil providing a mixture of oil and gas or air at the tip of the nozzle 14.

In operation, the flow of gas G passes through the outer peripheral tubing space 10 and exits at gas jets 12 and 16. An ignition providing the desired flow pattern and air pressure patterns in the region of the nozzle to prevent coking and to provide the desired particle size and structure characteristics of the black is produced.

The reasons that this combination of gas jet ports produces a higher level of structure than, for example, burners in which all of the gas tips are in the tips at positions corresponding to those indicated at 12, and at the same time produces a lower degree of discoloration of benzene by carbon black produced at the same or equal levels of surface area, particle size and structure than produced with the use alone of gas jets in positions analogous to those indicated at 16 but further back in the burner structure as taught by prior art construction is not fully understood nor theoretically explainable in its entirety. Suffice it to say, however, that carbon black having the desired properties, structure, particle size, surface area and producing the desired transmittance when tested by the discoloration of benzene in accord with ASTM: D1618 are obtained by the presently described structure.

Oil feedstock flowing through tube 22 and indicated by O passes down the tube 22 to the region of the venturi tip 28. Air, gas, a combination of air and gas or other suitable atomizing fluid, indicated by A, passing through venturi tube 26 enters the oil stream to produce an atomizing action beginning in the region just behind and adjacent to oil discharge orifice 24. The oil being atomized is discharged through orifice 24 and the process of carbon black production thereafter effected in accord with conventional and known techniques.

It is of the utmost importance in order to control the air pressure pattern and distribution and such other factors as may yet be undetermined but which nevertheless affect the structural characteristics, particle size and surface area of carbon blacks and the formation of coke, that the relationship of the gas jets to the oil orifice be well defined. In particular it has been found that the location of the multiplicity of gas jets 16 should be a distance L behind the plurality of gas jets 12 in nozzle 14 which is not greater than 30 times the diameter D of oil discharge orifice 24 and preferably not greater than 15 times the diameter D of the oil discharge orifice 24. While obviously variations outside of this desired limit may be employed with more or less success depending upon the particular properties desired and considered crucial in a particular application the presently described arrangement has been found particularly advantageous. For typical dimensions, the diameter of the oil orifice may be on the order of 0.02 to 0.25 inches in diameter and it has been found desirable to place the additional gas jets 16 approximately 3 inches behind the tip of the nozzle 14.

In general, each bank or circumferential group of gas jets will consist of six or more orifices designated 12 and 16 with each orifice having an approximate diameter of one-eighth inch.

The adjustment of venturi nozzles 28 may be varied slightly up and down the length of the oil tubing 22 but it is preferable to place it from approximately 0.3 to 0.5 inch from or otherwise as close as practically possible to the oil discharge orifice 24 since it has been found that the short exposure time of the atomized oil reduces coking and the high velocity of the atomizing fluid helps keep the nozzles scoured free of coke deposits.

In all cases, structure control may of course be achieved to some extent by manipulation of oil/gas ratios and the atomizing air rate along with other factors that are known in the art.

The advantage of the present apparatus is found primarily in its ability to achieve the desired properties of a non-staining large particle size, high structure carbon black which has low benzene discoloration and high transmittance.

In addition, of course, the simplified design evolved from placing the atomizing tip 28 closely adjacent the oil discharge orifice 24 provides for both economies of engineering design and economies derived from reduced maintenance costs and prevention of lost time by shutdown due to coking. Further, the atomizing air or gas settings required to produce the desired property remain more nearly constant and require less operator attention with the present design. In addition, a more consistent oil spray pattern is obtained for a longer period of time because of the prevention, at least in part, of the formation of coking deposits thereby resulting in a product of improved uniformity. Perhaps even more important from a practical standpoint, the present burner design described above enables a reduction in the required maintenance due to coking internally within the burner of over 100 fold with the resultant increase in net production time for each burner.

Without the use of multiple banks of gas ports high structure, large particle size blacks in the past have tended to exhibit high benzene discoloration. This condition has frequently caused the carbon black to fail to meet required specifications. However, by use of the presently described burners structure set forth above, it is possible to avoid this problem while producing a carbon black having the desired structural characteristics. Obviously, of course, the burner is not limited to the production of only carbon black having specified characteristics.

It should be understood that other means of atomization may be employed in the same mixing chamber region without departing from the spirit and scope of the present invention. It should also be understood that the dimensions and positioning of elements other than as defined in the attached claims are optional and may be varied by those skilled in the art over a wide range, and are given here merely for purposes of illustration.

Furthermore, although a specific preferred embodiment of the present invention has been described in the detailed description above, the above description is not intended to limit the invention to the particular forms or embodiments disclosed herein, since they are to be recognized as illustrative rather than restrictive. It will be obvious to those skilled in the art that the invention is not so limited. The invention is declared to cover all changes and modifications to the specific embodiments of the invention herein disclosed for purposes of illustration which do not constitute departures from the spirit and scope of the invention.

We claim:

1. An improved carbon black fuel burner construction for producing a controlled structure, high particle size nonstaining carbon black producing a low degree of discoloration of benzene when tested according to ASTM: D1618–65T, said burner being of the type which provides for the atomizing of an oil feedstock within an internal mixing chamber for discharge at an oil discharge orifice, which is circumferentially surrounded at the nozzle surrounding said oil discharge orifice by a plurality of combustion gas jets, wherein the improvement comprises: an additional plurality of circumferentially disposed combustion gas jets, positioned on the burner on the side of said first mentioned plurality of combustion gas jets opposite said oil discharge orifice, at a distance behind said first mentioned plurality of combustion gas jets which is less than 30 times the diameter of said oil discharge orifice.

2. The improvement of the burner construction of claim 1 in which said additional plurality of circumferentially disposed combustion gas jets is positioned on the burner on the side of said first mentioned plurality of combustion gas jets opposite said oil discharge orifice, at a distance behind said first mentioned plurality of combustion gas jets which is less than 15 times the diameter of said oil discharge orifice.

3. The improvement of the burner construction of claim 2 which further comprises the provision of said internal mixing chamber proximately adjacent to said oil discharge orifice of said burner, whereby internal coking of said burner is reduced.

4. The improvement of the burner construction of claim 3 which further comprises the provision of a venturi tip within said internal mixing chamber proximate to said first mentioned plurality of combustion gas jets and adjacent to said oil discharge orifice of said burner and at least 10 times the diameter of said oil discharge orifice from said additional plurality of circumferentially disposed combustion gas jets.

* * * * *